United States Patent [19]

Gray

[11] Patent Number: 5,802,396
[45] Date of Patent: Sep. 1, 1998

[54] ADAPTIVE COMMUNICATION SYSTEM

[75] Inventor: Thomas A. Gray, Carp, Canada

[73] Assignee: Mitel Corporation, Kanata, Canada

[21] Appl. No.: 367,821

[22] Filed: Jan. 3, 1995

Related U.S. Application Data

[63] Continuation-in-part of Ser. No. 257,917, Jun. 10, 1994, Pat. No. 5,638,494.

[51] Int. Cl.$^6$ .............. G06F 9/38; G06F 9/34; G06F 9/40
[52] U.S. Cl. .............. 395/840; 395/382; 395/391; 395/587; 395/595; 364/DIG. 1; 364/DIG. 2
[58] Field of Search .............. 395/200.15, 200.16, 395/676, 872, 382, 800, 500, 840, 183.11, 183.21, 200.11, 587, 200.01, 595, 702, 200.49, 707, 708, 183.14, 567; 340/825.54; 455/76, 33.3, 33.4, 38.1, 35.1; 375/365; 364/DIG. 1, DIG. 2

[56] References Cited

U.S. PATENT DOCUMENTS

| | | | |
|---|---|---|---|
| 4,027,243 | 5/1977 | Stackhouse et al. | 375/365 |
| 4,477,809 | 10/1984 | Bose | 340/825.54 |
| 4,484,355 | 11/1984 | Henke et al. | 455/76 |
| 4,530,051 | 7/1985 | Johnson et al. | 364/200 |
| 4,545,071 | 10/1985 | Freeburg | 455/33.3 |
| 5,448,709 | 9/1995 | Chamdler et al. | 395/872 |
| 5,542,070 | 7/1996 | LeBlame et al. | 395/500 |
| 5,553,305 | 9/1996 | Gregor et al. | 395/676 |

FOREIGN PATENT DOCUMENTS

WO 86/03926  7/1986  WIPO.

*Primary Examiner*—Daniel H. Pan
*Attorney, Agent, or Firm*—Charles E. Wands

[57] ABSTRACT

A method of operating an agent is comprised of receiving a message (goal) from another agent and performing a sequence of actions required by the goal, each action of the sequence of actions containing at least one instruction, each instruction containing an index number (PC), an action pointing to another action in a thread of actions, informing a subsequent action of a previous instruction including designating the PC of the previous instruction whereby a subsequent action is informed of an instructing PC, and returning an action completion acknowledgment message to a preceding action containing an instruction designated by the instructing PC, whereby the action containing the instructing PC can point to various different PCs to carry out different actions upon receipt of various acknowledgment messages.

6 Claims, 13 Drawing Sheets

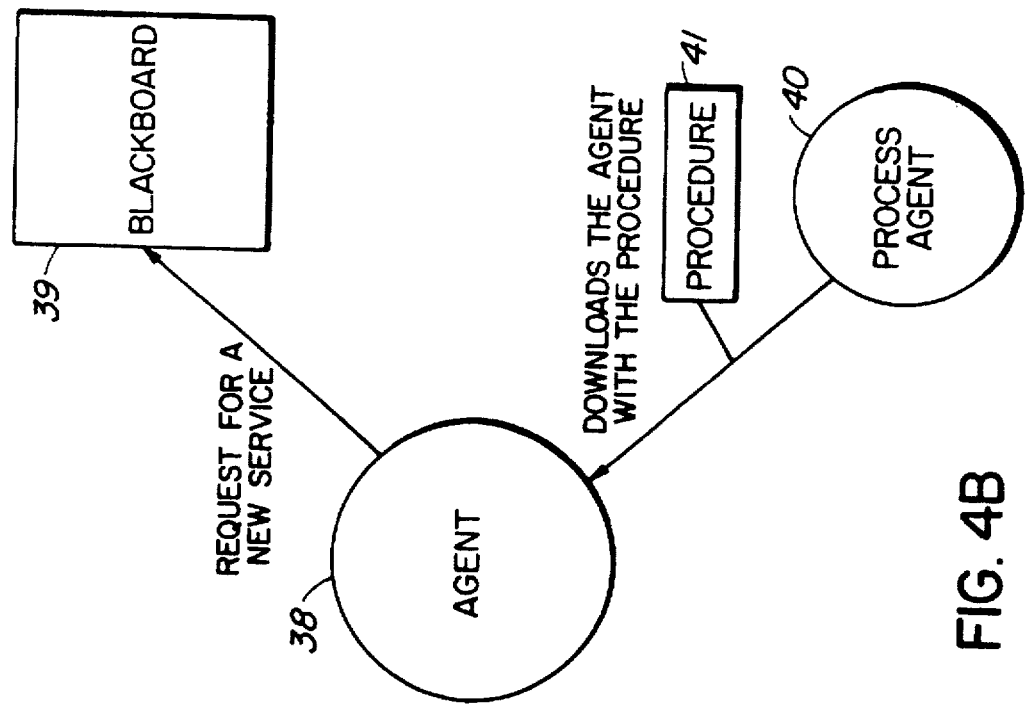
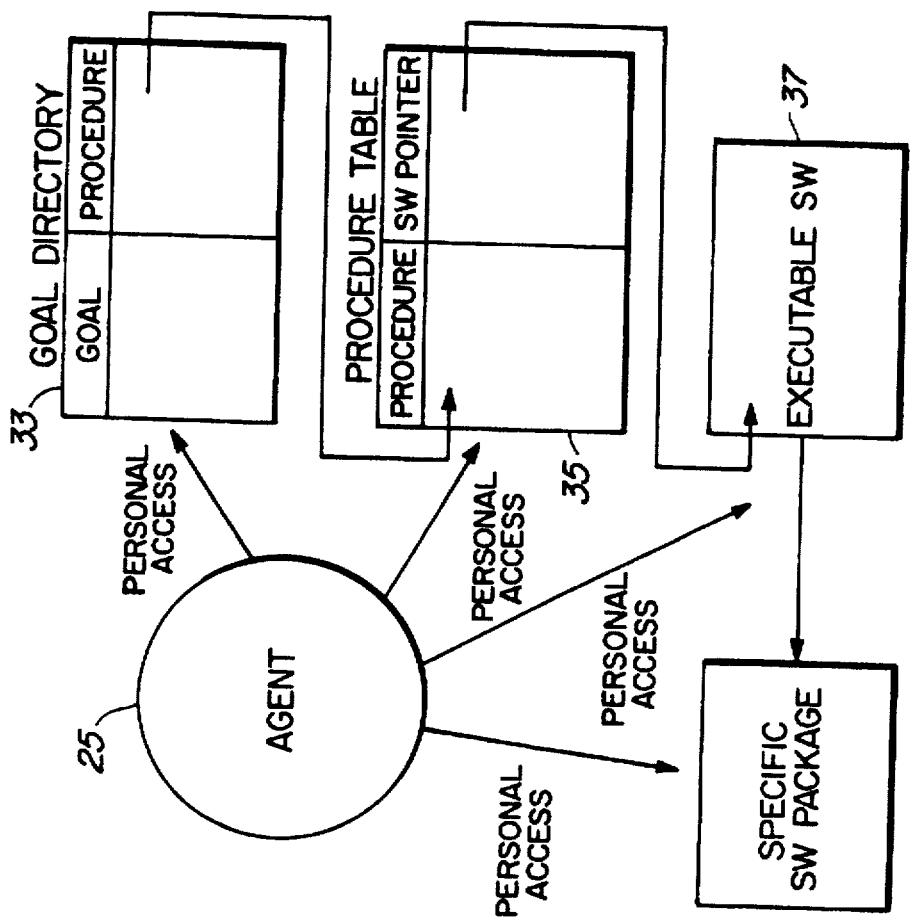
FIG. 4B
FIG. 4A

5,802,396

ADAPTIVE COMMUNICATION SYSTEM

This is a continuation-in-part of U.S. application 08/257,917 filed Jun. 10, 1994 now U.S. Pat. No. 5,638,494.

FIELD OF THE INVENTION

This invention relates to a communication system, and more particularly to a novel architecture and method of operating such a system, and to parts of such a system, which is self-adapted to the requirements of its users.

BACKGROUND TO THE INVENTION

Communications systems, and in particular communication switching systems, have in the past been formed of structures which perform functions which are predefined. These communication systems constrain users to communicate in the ways fixed by the communication systems. Thus the users are required to adapt to the constraints of the system, rather than the system adapting to the needs of the users.

Changing a communication system to provide new services is a serious and costly proposition, requiring design of new operating and peripheral software, new hardware, etc. Design and implementation of new software is sometimes dangerous to the entire system, since change to one part of the system software can sometimes affect other parts, in the same or in other shell levels, for which documentation is not clear or accidentally overlooked. Thus to change or add features to a communication system the cost must be incurred of checking the entire system for effects of the change or addition, with risk of error and resulting problems, sometimes but not always obscure, and sometimes only appearing long after the system has been installed. Recent failures of the telephone network used by millions of people in parts of the United States is an example of an obscure communication system control software problem integral to a system not appearing until long after the system has been installed and operating.

SUMMARY OF THE INVENTION

The present invention is a communication system which is self adaptive to its users, and both creates and provides the services required as needed. The system can be used to manage the flow of work, detect and correct inefficiencies, negotiate service with outside systems, and can be tightly integrated with and adapt to the human based user organization's work processes and goals.

These goals include the mechanisms by which information is shared, stored and disseminated within a group. The system can directly assist in fulfilling a mission of a group. It can be a distributed system which can work with a variety of devices, including devices which are typically used with current fixed structure systems, and allows services to be created and changed dynamically, thus being adaptable to new needs of a group of users.

In general, an embodiment of the invention is a communication system comprising a plurality of process agents for receiving goal commands (goals) and invoking a process to achieve results of the commands, a plurality of device agents, each in communication with its own device, for receiving goals from a process agent, and for operating its corresponding device in response to receiving the goals from a process agent in accordance to a commanded agent, and a network interconnecting all of the agents for carrying goals between agents.

A configuration structure stores data defining processes, available resources and knowledge data for each agent, and for downloading the definition to each agent.

In accordance with another embodiment, a method of operating an agent is comprised of receiving a message (goal) from another agent and performing a sequence of actions required by the goal, each action of the sequence of actions containing at least one instruction, each instruction containing an index number (PC), an action pointing to another action in a thread of actions, informing a subsequent action of a previous instruction including designating the PC of the previous instruction whereby a subsequent action is informed of an instructing PC, and returning an action completion acknowledgment message to a preceding action containing an instruction designated by the instructing PC, whereby the action containing the instructing PC can point to various different PCs to carry out different actions upon receipt of various acknowledgment messages.

BRIEF INTRODUCTION TO THE DRAWINGS

A better understanding of the invention will be obtained by reading the description of the invention below, with reference to the following drawings, in which:

FIG. 4A is a block schematic of a goal resolution mechanism of an agent,

FIGS. 4B–4D illustrate various processes of creating new agents,

DETAILED DESCRIPTION OF THE INVENTION

Figure 1A:
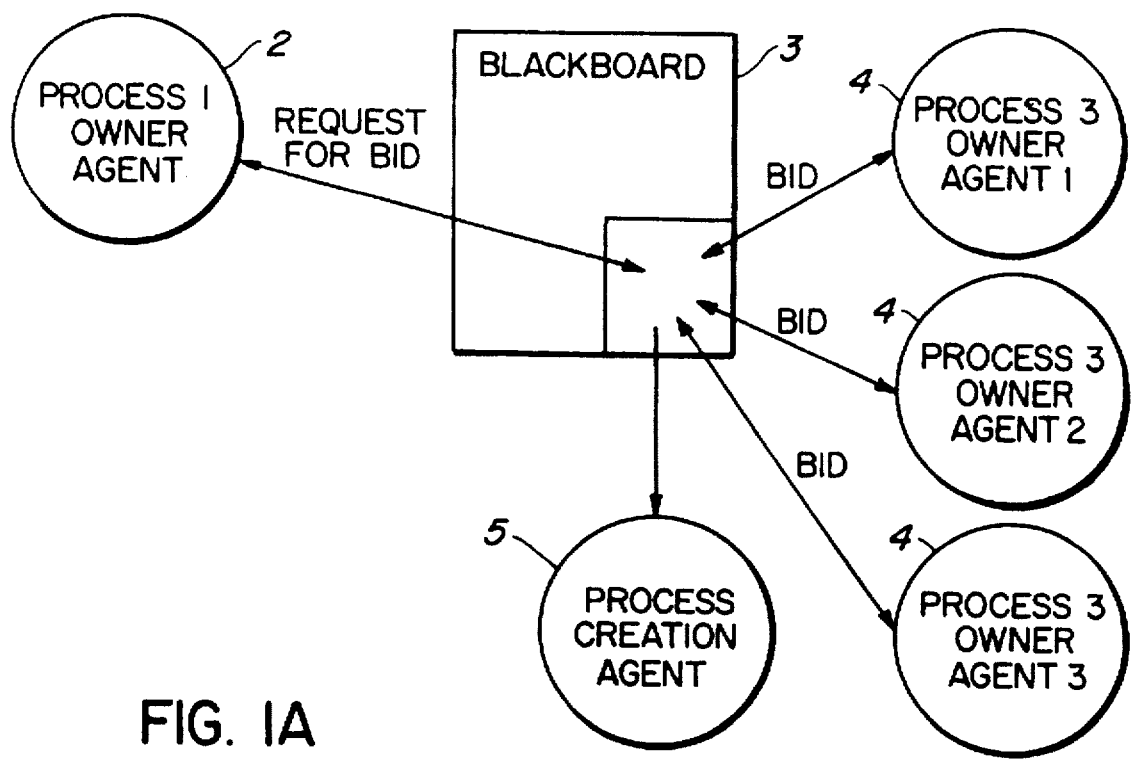
FIG. 1A is a block diagram of a blackboard system.

The concept of a general system using agents has been described in the publications "Toward A Taxonomy Of Multi-Agent Systems", Int. J. Man-Machine Studies (1993) 39, 689–704, Academic Press Limited, and "An Intelligent Agent Framework For Enterprise Integration" by Jeff Y. C. Pan and Jay M. Tenenbaum, Transactions On Systems, Man, and Cybernetics, Vol 21, No. 6, November/December 1991 pp 1391–1407, which are incorporated herein by reference.

Subsystems and devices used in the present invention will now be described. Processes described are comprised of computer software executed on a processor, which includes any required program and data storage apparatus, such as random access memories.

Devices described herein are persons, software application programs or machines that can accomplish a task, and are defined by their capabilities and capacities. Devices are owned, and have their capabilities distributed via ownership. A device is limited; external devices are not aware of how tasks are accomplished internally of the device. A device may contain other devices and agents internally, but these internal elements are not visible externally.

An agent is a physical entity, as will be described below in more detail, which can accept a goal or goals, and produce an outcome. That outcome may be another goal or a set of goals. An agent may be the external representation of a device.

An agent only functions for the goals of which it has knowledge. A method for accomplishment of each goal is associated with each goal. These methods may involve planning, within the agent.

An agent may directly represent a device, or work through intermediate agents or devices, but is associated with its intermediary devices through a resource.

An agent sees only the portion of the capabilities of a device or of another agent it is entitled to use, and a technique for using it, which is referred to as representation of the device or of the resource. A resource may consist of the representations of several devices and means for selecting from them. The means for selecting from several devices is referred to as a broker.

A goal is an input to an agent, and specifies a task which an agent is to perform. Each goal is associated with a method for accomplishing the goal, as described in more detail later in this specification.

The capability of endowing an agent with goals and resources is referred to as jurisdiction. Thus a higher level agent may use a lower level agent over which it has jurisdiction, as part of its goal definition, and thus it may endow the lower level agent with capabilities. A higher level agent with jurisdiction can provide another agent with the lower level agent as a resource.

The rights to use parts of the capability and the capacity of a device is referred to as ownership, and the granting of these rights for a device that is used by another device may only be done through ownership. Ownership may be of several types: constant, statistical, or as available.

Ownership may be devolved through a hierarchy or resources. Devolved ownership carries constraints; a devolved owner may devolve any type of ownership and add constraints, but may not remove constraints placed on a device by a higher level agent. Ownership is also devolved on different time scales. Some higher level agents will require almost permanent ownership of a device, for example a group with rights to a database system. This ownership can be devolved dynamically, such as when a group allocates the rights to a group member for a single transaction.

An allocated device may police its submitted goals to be sure that no other agent is exceeding its ownership rights. However, policing may not be necessary if done informally by policy.

The technique used by a resource to select among devices which can be used to accomplish a goal, is an allocation mechanism. The allocation mechanism is designed locally for the purposes of the resource. Together with the device representations, the allocation mechanism constitutes a broker within the resource. The broker is designed to achieve a purpose local to the resource, e.g. lowest cost, reliability, redundancy, most suitable device, etc. The broker may include a pseudo-cost bidding system, or some other suitable mechanism.

The enterprise modelling tool allows an enterprised to be modelled as a hierarchy, a set of processes (which for example may be serial with or without branches), resources (such as a telephone, a computer, a text-to speech converter, a facsimile machine, a filing cabinet, individuals such as a manager, a software designer, a purchasing agent, etc.), and an activity which utilizes resources.

Some generic processes can be supplied, such as "make a call", which internally can be represented by a series of activities and resources. The present invention takes these data as input and creates the underlying agents needed to run a system.

The present invention does not simulate a system, but is used to define the enterprise itself and to create the agents underneath to perform the actual execution of the defined processes.

An owner agent has the task of mapping a generic process from a system tool onto physical agents. Thus once the tool has defined the generic process needed, an agent is created to contain the physical process. Once it has been created, its task is to obtain and connect physical agents corresponding to the generic agents. In accordance with a preferred embodiment of the invention, it does this using a blackboard system.

Blackboard system have been described in the publications "Blackboard Systems", by Daniel Corkill, published in AI Expert, September 1991, pp 41–47, "Blackboard Systems: The Blackboard Model of Problem Solving and the Evolution of Blackboard Architectures" by H. Penny Nii, Published in The AI Magazine, Summer 1986, pp. 38–53, and "Elevator Scheduling System Using Blackboard Architecture", by Grantham K. H. Pang, published in IEE Proceedings-D, Bol 138, No. 4, July 1991, pp. 337–346, which are incorporated herein by reference.

As illustrated in FIG. 1A, an owner agent 2 containing process 1 posts a task to a blackboard (RAM) 3. This is interpreted by other owner agents 4 as a request for bids. Agents 4 then post bids to complete the process, in accordance with the resources over which they have jurisdiction, and the economics of the completion of the task. In the present invention, the agents have particular design, for example containing brokers, as will be described in more detail below.

Figure 1C:
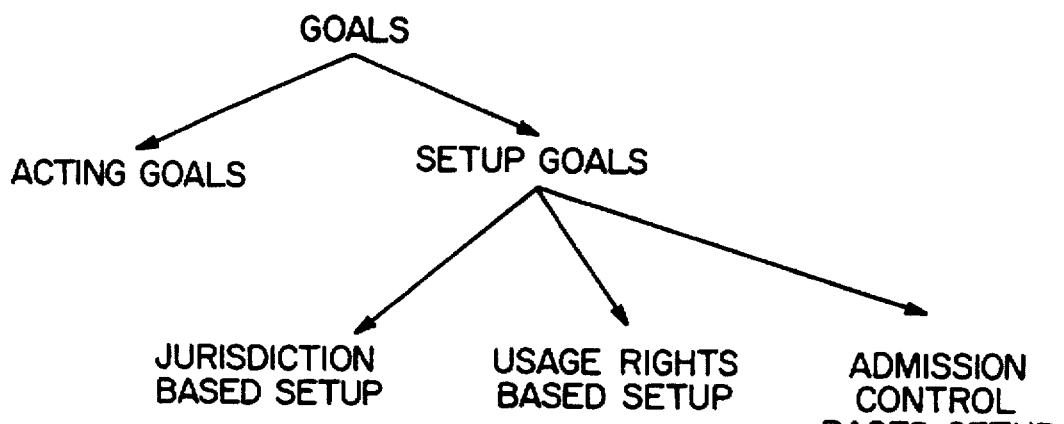
FIG. 1C is an illustration of a hierarchy of goals as used in the invention.
Figure 1D:
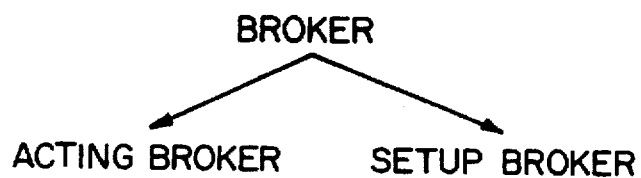
FIG. 1D illustrates different kinds of brokers.
Figure 1B:
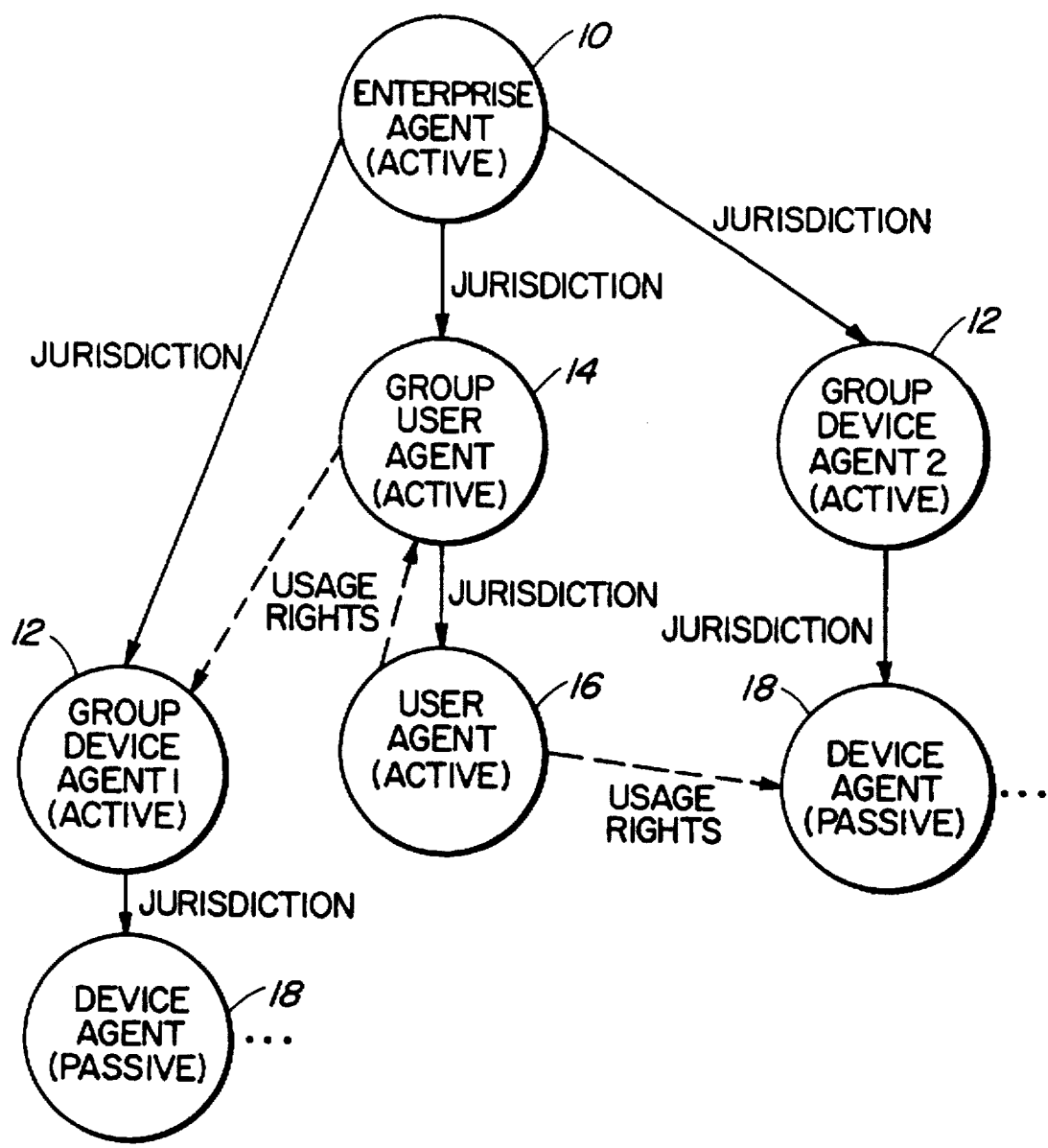
FIG. 1B is a relationship diagram of various agents used in the invention.

FIG. 1B illustrates a logical view of agent to agent communication used in the present invention. Jurisdiction is shown by a solid line arrow and usage rights is shown by a broken line arrow. An enterprise agent has jurisdiction over all the other agents below it in hierarchy, e.g. group device agents 12, group user agents 14, etc. Similarly, the group user agent has jurisdiction over the user agents 16 below it, the group device agents have jurisdiction over the device agents 18 below them, etc. The group user agent 14 has usage rights over a portion of the service provided by group device agent 1 (12). The user agent 16 has usage rights over a portion of services provided by the device controlled by the device agent under group device agent 2 (12).

Two types of goals can be presented to an agent: acting goals and setting goals. An acting goal is a request for a particular service which uses resources immediately. A setting goal is a request to set up a resource for use later by an acting goal.

In accordance with the preferred embodiment, as shown in FIG. 1C there are three types of setting goals: (a) goals based on jurisdiction, which tell an agent what goals it can provide, the methods for accomplishing those goals, and the usage rights on resources it needs to provide the goals, (b) goals based on usage rights, where customization is done on a resource over which the agent has usage rights, and (c) a goal for admission control, whereby it causes resources to be reserved, and grants usage rights to other agents for resources.

With reference to FIG. 1D, there are different types of brokers which reside in the resource area of an agent. An acting broker acts on a request of an acting goal, for immediate use of a resource. A setup broker satisfies all three types of setup goals, for example be sending any one of, or all of the three types of setup goals to other agents.

Brokers can select among resources the agent has usage rights over in order to better accomplish a goal, or can grant usage rights to another agent, or can set up goals and usage rights for its agent, or can customize resources which the agent has usage rights over.

With reference again to FIG. 1B, there are two different kinds of agents; active and passive. An active agent can accept acting goals which require resources which are accessed by other agents. A passive agent can only accept acting goals which can be accomplished without requiring resources from another agent. A passive agent is an atomic agent, typically representing a singe device or a unit (group) of data.

Agents can be specialized for different types of work.

For example, an enterprise agent represents the needs and wants of an enterprise. It could invoke company-wide restrictions on resources, and could be the keeper of the agent directory which has the knowledge of all agent addresses.

A group user agent could represent a group of people which have been assigned a task to perform. A user agent could represent a single person.

A group device agent could be the initiator, or configurator, or creator of device agents for a particular device type.

These agents are all active agents.

A device agent could represent data, or a task that a person can perform, or a physical device including the actions of the device as well as setup information. This is a passive agent.

Other agents, for example, could be billing agents, policing agents, mobility managers, security (anti-hacker) agents, maintenance agents, traffic analysis agents, event tracking agents, etc.

Agents may have different means of allocating resources and decomposing goals, depending on their environment. This can be done to simplify the agent and speed up implementation and provisioning of services. Congestion control procedures can be implemented if there is knowledge of the type of coupling between systems. Tight coupling occurs when two agents know of each other's resources and locations. Policy coupling occurs when there is no real knowledge of the internal operation of another agent. Resource allocation is done dynamically on a policy basis. Contract coupling occurs when there is no real knowledge of the internal operation of the resource. Resource allocation is static, and can only be changed on a contractual basis. Congestion control must be done on a protocol decoupled basis. Information areas may not be used.

Figure 2B:
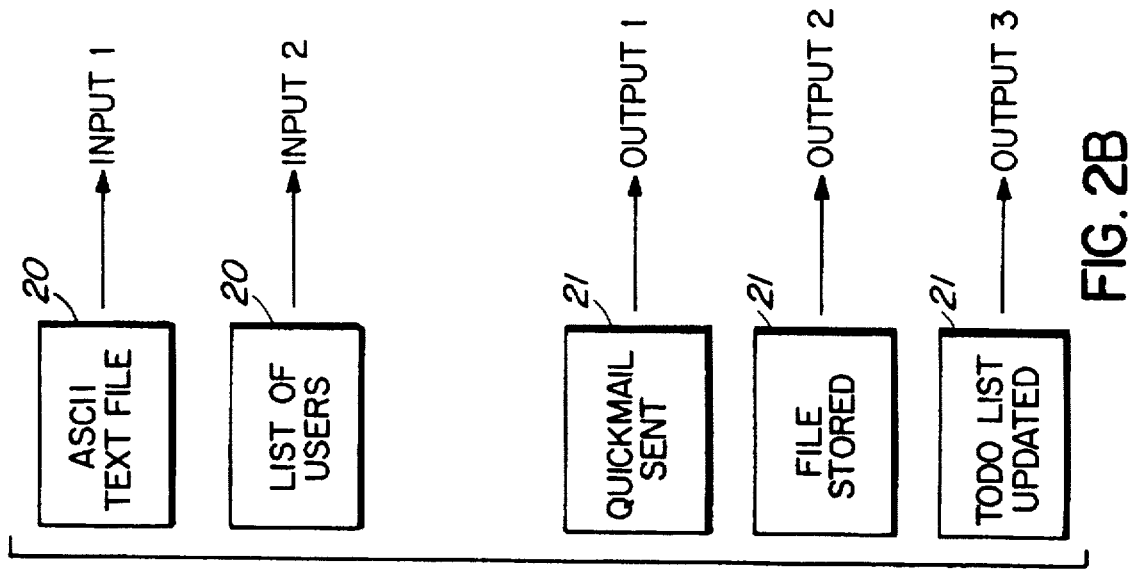
FIG. 2B is an illustration of an example process carried out by an agent.
Figure 2A:
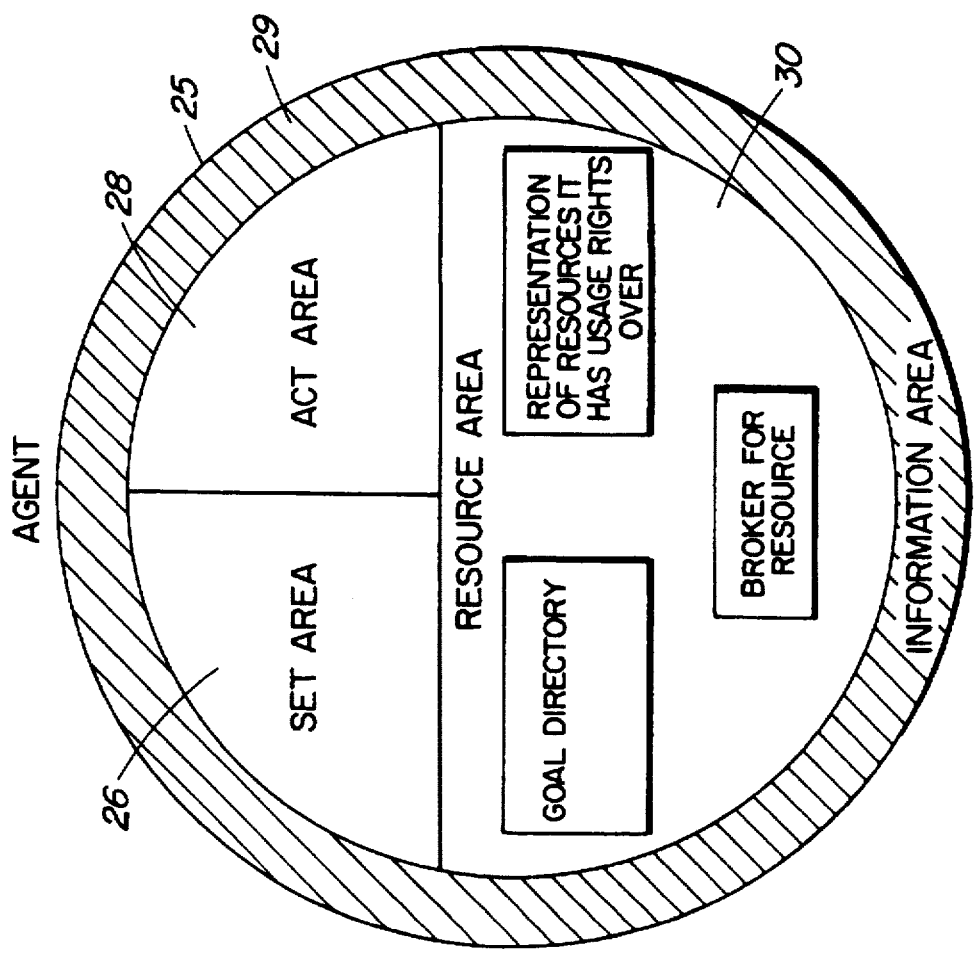
FIG. 2A is a diagram illustrating the general structure of an agent.

The structure of an agent 25 is shown in general in FIG. 2A. The agent is categorized into four parts: an information area 29, a set area 26, an act area 28, and a resource area 30.

The information area 29 represents an area to which the agent posts information about its resources. Any agent which has usage rights over resources, or portions of resources, in this agent has read privileges for this area, if it can gain access to it. Access can be by direct read or be message based.

The set area 26 represents the ability of an agent to accept setup goals of all three types. In a passive agent, it can only accept goals in its goal directory which do not decompose into goals for other agents. When a setting goal is received and decomposes into a unit which represents a resource over which it has usage rights, then it is possible for a feature interaction to occur, and it should be checked for and dealt with here.

The act area 28 represents the ability of an agent to accept an acting goal and to decompose it into other goals which it passes on to other agents, or into resources to which it has usage rights. In a passive agent, goals can only decompose into resources that require no other agent interactions. When it decomposes into a unit which represents a resource over which it has it has usage rights, then it is possible that a feature interaction can occur, and must be checked for and dealt with here, when that resource is used. The responsibility for the execution of the steps that need to be followed once a goal is decomposed is in this area. This may involve reactive planning. An agent can only act on goals which it has knowledge of.

The resource area 30 represents the data and knowledge sources needed in the decomposition of a goal. It is private to the agent. A goal directory 30A breaks goals down into their constituent parts, is written to and from the set area 26, and is used from the act area 28. The representation of the resources including basic function, capacity, constraints, bidding mechanism, etc., is also contained in this area, as well as the knowledge source needed to utilize a resource. This can also be written from the set area 26, and used from the act area 28.

In order to set up a system of processes, with agents that have no knowledge of other agents and what resources they use, or how they use them, the initial setup of the system defines the processes, decomposes them into goals for various agents, and the resources needed to accomplish each goal. In a preferred embodiment of the invention, this is accomplished by a system which defines in databases the enterprise in terms of the organizational structure, including the users, the devices and the resources that they use. The processes that need to be done should be described, including the users, groups and resources needed to accomplish each part of them, and in what order. Once the databases are complete, they are decomposed into the goals and resources needed in each agent, and the agents are downloaded with this data. A process is defined as a series of goals, which need resources, and these goals are performed in a predetermined pattern. Thus it may be seen that a telephone call constitutes a process, a request to print data is a process, and an order to purchase equipment is a process of the enterprise.

Simple messages can be used to accomplish complicated tasks, since it is the interpretation of the messages by the agents which gives the system the ability to adapt and change to needs of the users.

Thus services can be created dynamically by having a process agent, which has the sole task to create and maintain services. In accordance with an embodiment of the invention, entities which request new services of processes post their request to an area of a blackboard. A request could for example come from agent 2 (FIG. 1A), as a dynamic request, or from an enterprise modelling tool which has collected via static input a process that needs to be added to the communication system. This spawns a process agent 5 which is responsible for attempting to meet the requested process.

The requested process is described in terms of a group of inputs and desired outputs. The process agent has access to a database, in one embodiment, which has a digit-tree-like structure made up of pointers to existing agents which can handle various tasks. The process agent reads and interprets this data in order to determine which agents are required to realize the requested service.

The process agent then negotiates the usage rights with each of the various agents involved in creating the new process, on pieces needed to create a new process necessary to run the new requested service.

The new process agent decides whether or not to install itself in the database of existing processes, in order to become accessible to other agents wanting the same service. The new process agent could also provide itself to the requesting agent, and eliminate itself otherwise.

An example of operation of the above will now be described, with reference to FIGS. 2B. A user would like to create a new process to handle monthly reports. On finishing the report, the user would like it to automatically be stored in a memory, mailed to a specific mailing list, and have a "to do" list updated. We will assume that there already exists an agent which handles the sending of ASCII text files to a given user (e.g. a process agent which takes the ASCII file, and sends it to an agent which converts it to a correct format, and then sends it to an agent which does the actual sending). We assume that there also already exists an agent which is responsible for storing files, and another agent which handles "to do" lists of users.

The request of the user is posted to a blackboard, a new process agent is created and given expected inputs from input agents 20 and expected outputs of output agents 21. The new process agent then negotiates usage rights with the existing agents 20 and 21, and puts a procedure together which is comprised of sending a goal to the correct ASCII to Quickmail agent, for each member on the list of users provided, and then sends the file to the storage agent, and makes an update list request to the user's "to do" list agent.

This of course could become an iterative process, wherein the process agent may need to invoke another process agent.

Figure 3A:
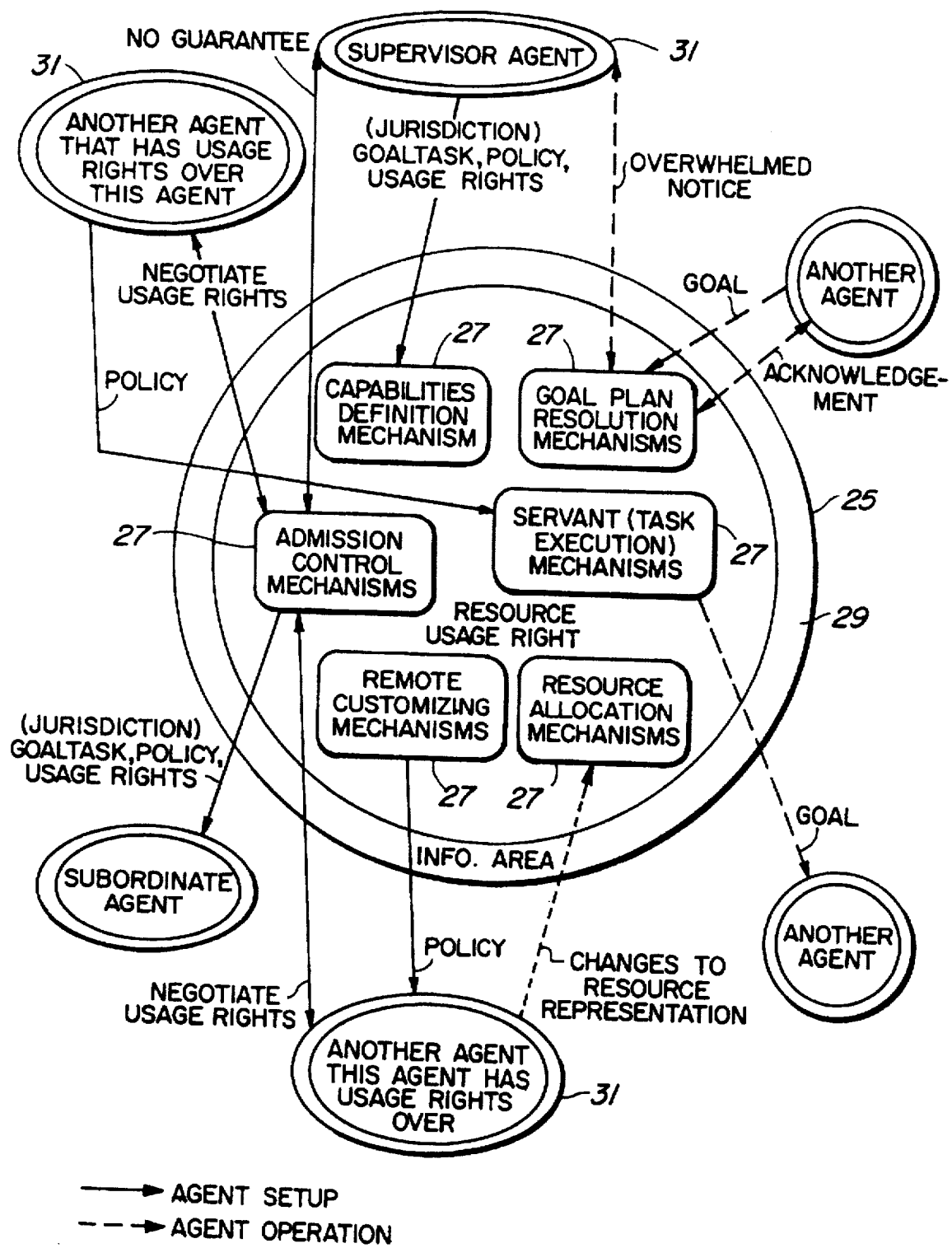
FIG. 3A illustrates a block diagram of an agent.

FIG. 3A illustrates an agent 25 in accordance with a preferred embodiment of the invention, and how it communicates with other agents. The solid arrows illustrate communication links during set-up, and the dashed line arrows illustrate communication links during operation.

The agent 25 is comprised of various routines 27 and data 29, all of which is of course stored in memory. The data 29 is generally referred to as an information area. Routines 27 shown in FIG. 3A are servant (task execution) mechanisms, goal or plan resolution mechanisms, capabilities definition mechanisms, admission control mechanisms, remote customizing mechanisms, and resource allocation mechanisms. Links are shown to external (other) agents 31, such as a supervisory agent, a subordinate agent, another agent that has usage rights over agent 25, another agent over which this agent has usage rights, etc.

Figure 3B:
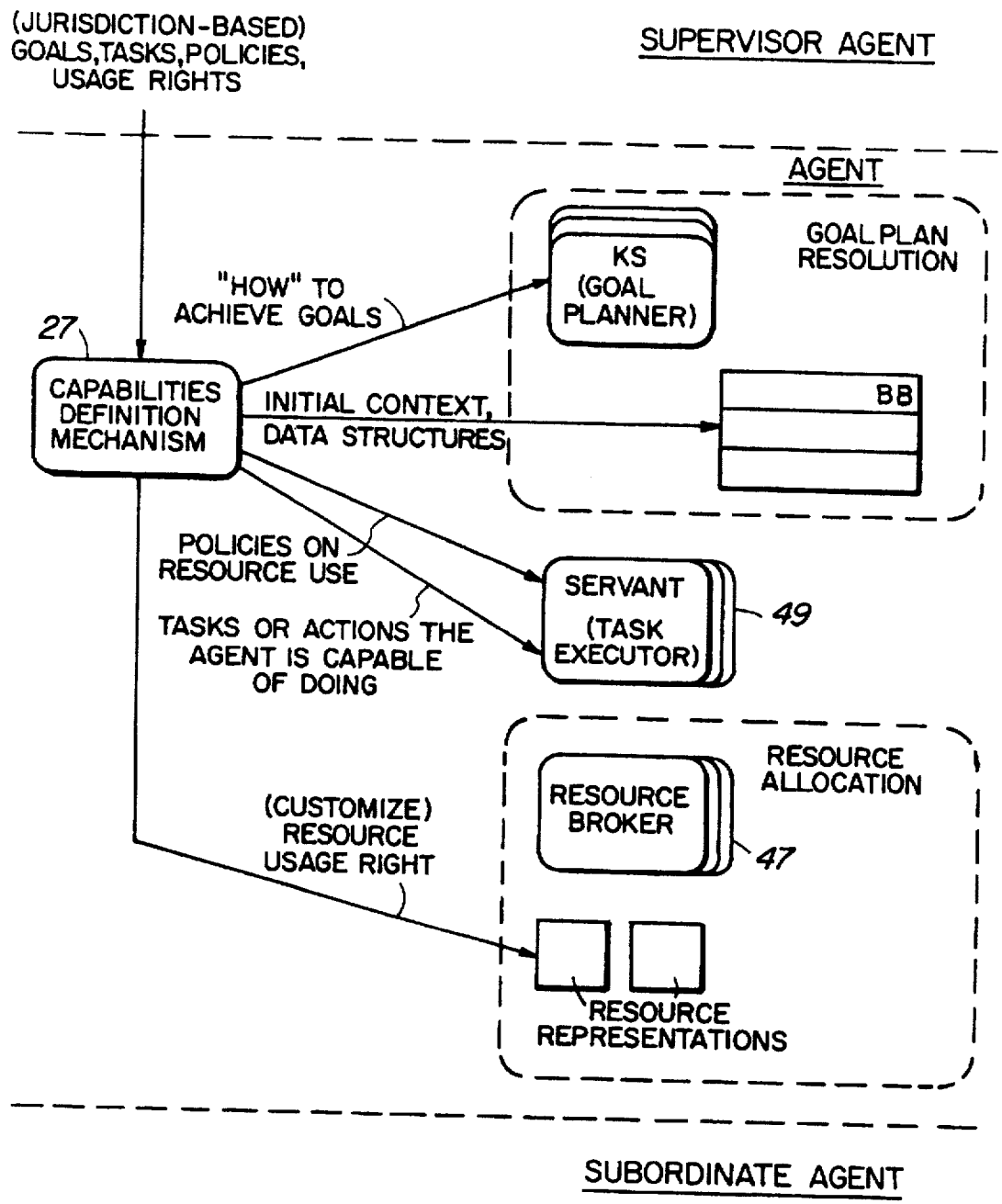
FIGS. 3B, 3C and 3D illustrate the functions of routines of an agent.
Figure 3C:
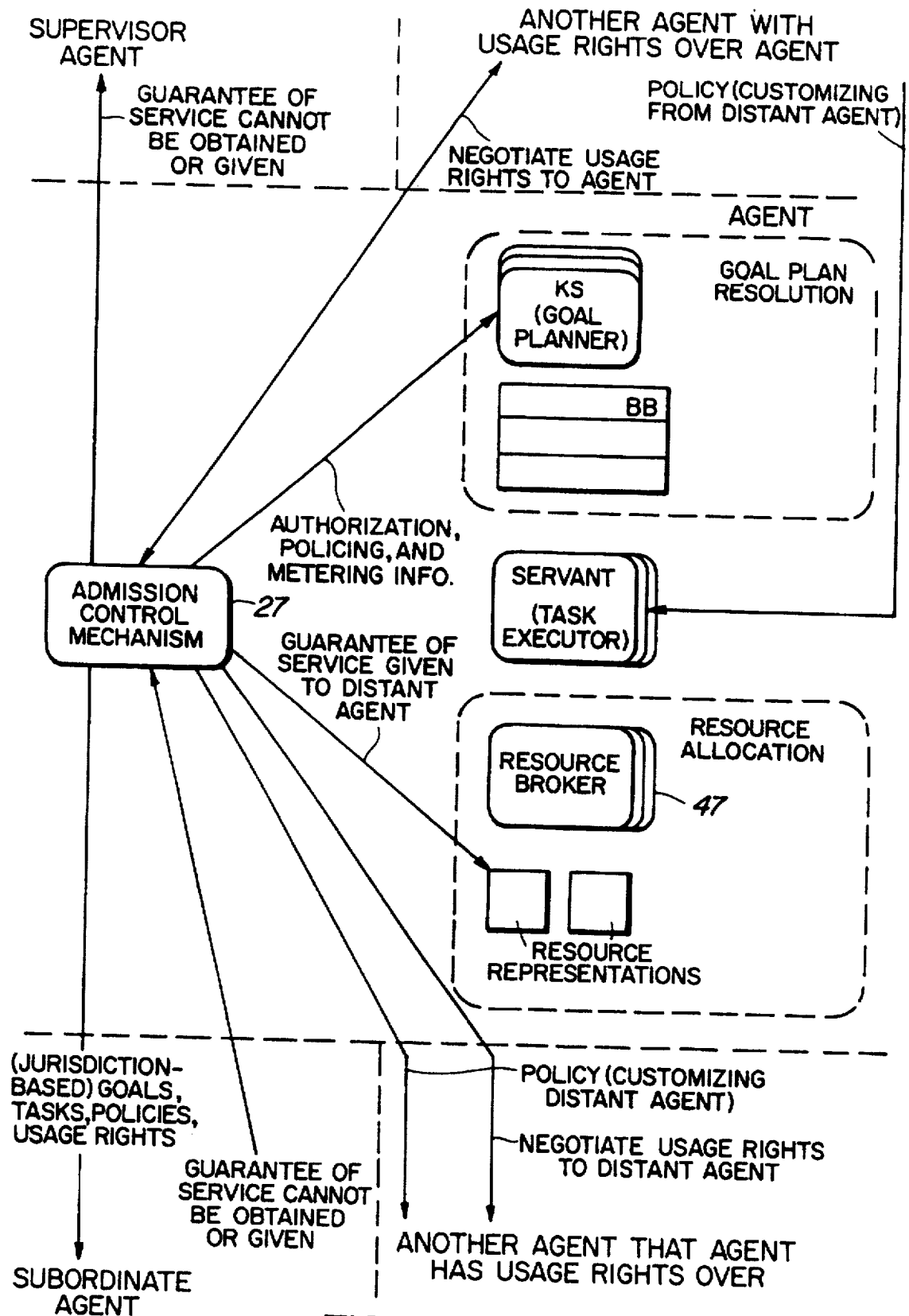
Figure 3D:
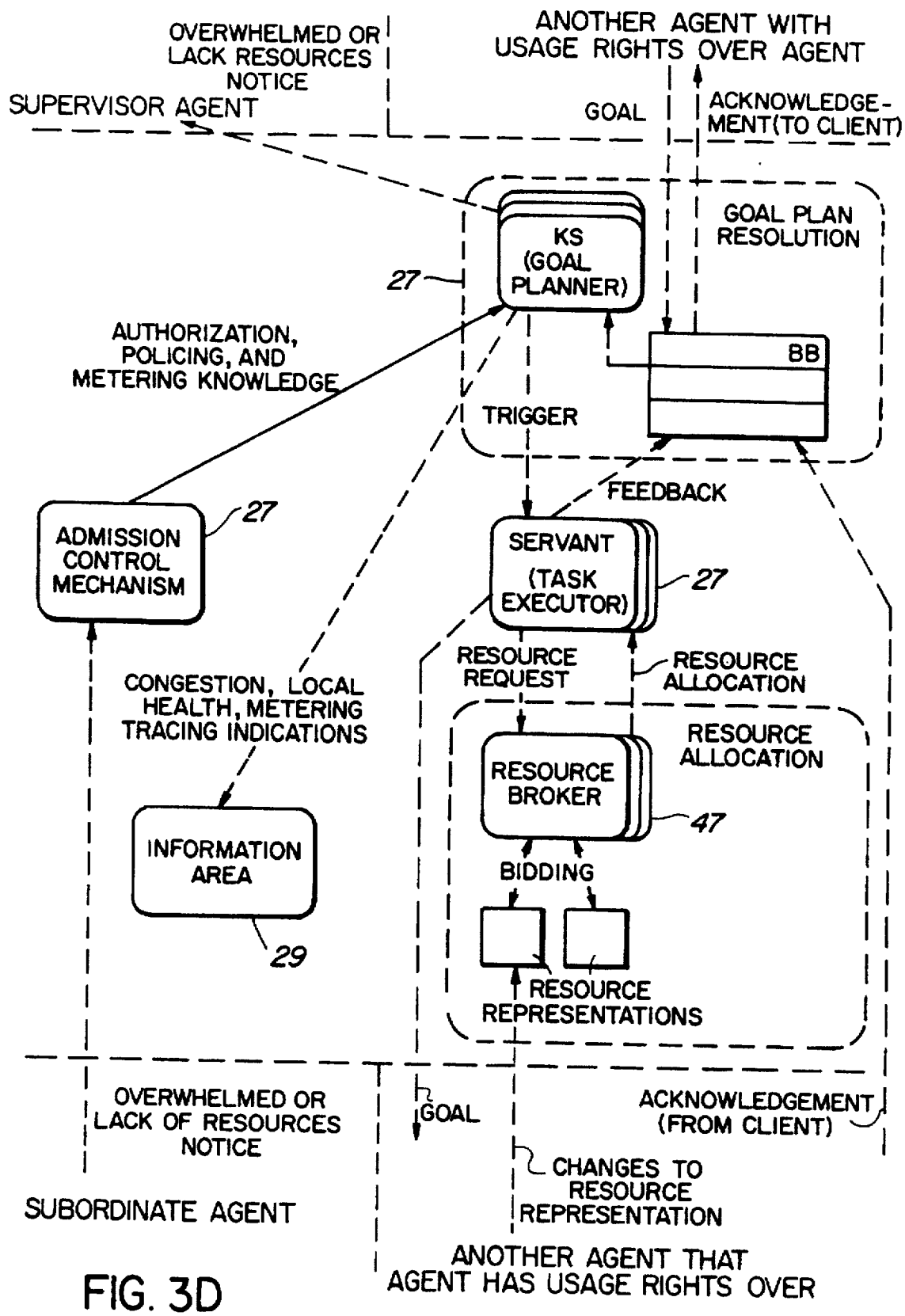

The various routines have functions as follows, with reference to FIGS. 3B and 3C.

The capability definition mechanism receives goals, tasks, policies and usage rights from an agent which has jurisdiction over this agent, i.e. from a higher level agents. It creates knowledge sources and update the blackboard structure in the act area (28, FIG. 2A). It will also "know" how goals may be satisfied. It will also place servant objects that can execute the possible tasks that will satisfy the different goals in the task executor 49. Representations are placed in a resource broker area 47 (representations of usage rights for resources in order to satisfy goals). This mechanism can add resources in excess of that provided by the group agent to locally customize; the local manager can "purchase" resources independent of the enterprise. It can also customize policies for the broker area.

The admission control mechanism 27 provides usage rights of this agent to other agents; it also provides performance guarantees to other agents. It contains methods for prediction of capacity and performance for the resources, including subsidiary agents, that it controls. The admission control provides authorization and policing information to the act area (28, in FIG. 2A). It contains a method to create lower level agents and to provide these agents with usage rights (goals and resources). The data contained in this area is comprised of the capacity and capability of the agent.

The admission control mechanism also acts to maintain lower level agents in existence, or respond to keep alive messages from upper level agents, which may be done by reading distant information areas, and by sending messages. It prevents the proliferation of orphan agents which have lost contact with the rest of the system; orphan agents should self-destruct.

The agent can modify policies on resource use in the servant object area of a distant agent, and contains methods for modifying those agents over which it has usage rights. The agent can customize a servant object in a distant agent; for example on the push of a specific button on a telephone, a user agent can customize messages sent as a result.

The goal resolution mechanism area (27 in FIG. 3A) accepts goals which are to be executed, which goals will be analyzed and processed by several entities. These entities can be comprised of goal parsing, process, authorization, metering, policing, congestion analysis, resource management, tracing, diagnosis, etc.. It is the purpose of the goal resolution mechanism to select the proper action to achieve a goal, given the constraints of the aforenoted entities.

This area functions as an opportunistic reasoner to select an action, given the context of the agent, its resources and the current goals impinging on it. The area could include a blackboard. It interprets/parses an incoming received goal, creates a hypothesis on how to satisfy a goal using a current context, constrains the action of processes which include policing, metering, etc. It can or does also send a goal to the group agent, if overwhelmed by incoming goals, or lacks sufficient resources to realize a goal.

The resource allocation mechanism contains a local representation of resources that the agent has usage rights over, i.e. usage rights information, how much an agent is currently using, and if necessary some information from the information area of the resource agent. This information is comprised of information relevant to the capability of a distant agent to provide the service that it has contracted from. This information from the distant information area can be updated periodically or instantaneously.

If it is not possible to obtain information from the distant information area, the local representation of a resource relies on guarantees supplied by the resource agent a priori. These representations can take part in a bidding process with a broker to supply resources to a servant object, and contain usage rights guarantees and updates the resource has provided a priori to the agent.

The representation contains the address of physical resources, and thus the resource agent can update the representation for reasons of fault congestion, etc. The updating can be triggered by either side dynamically, or periodically. A broker selects resources for a servant object based on policies which have been set up by that servant object.

The servant area 27 (FIG. 3A) contains objects or procedures which can perform the actions upon the goal resolution area. These actions which can be set for a servant object are called tasks. A servant object may be local to an agent, or it may be a pointer to a service provided elsewhere in the network. The servant area may be considered the output of the agent.

This object performs tasks upon receiving trigger messages from the act area. Trigger messages contain the same format of identification and index for identifying the context of the task as the goal message. The object can also feedback the success or failure of the act area relative to the tasks.

The feedback messages can be used to update the context of the act area and thus be used to trigger further action to achieve the goal in that area.

The further action may well be to trigger other servant objects which can further the achievement of the goal. It may be possible for one servant object to trigger another directly to achieve the same purpose. However in general, this is considered less desirable since (a) it prevents the goal resolution area from knowing the full context of the goal and thus prevents it from using its full reasoning capability, and (b) it requires that servant objects have knowledge of each other's capabilities and current states. This harms the independence of these servants and is a task best left to the goal resolution area.

The servant objects should contain policies for the selection of resources by the resource broker. It is important that these policies should be maintained in this area, since they should be able to be customized to the requirements of the local user and also be dependent upon the current actions of the agent.

Upon receiving a trigger message from the act area, a servant object may request more resources from the group agent.

The information area 29 is an area in which the agent can write information which can be used to coordinate its actions with other agents or systems. This can include local system health, congestion indications, metering, tracing, local agent context, and other information pertinent to the activity of the agent.

Information in the information area can be collected by specialized agents and processed to diagnose system problems, congestion, billing, etc. For other agents, the information area is restricted to read only.

Goal and task messages must be flagged with an identification, to indicate the calling agent and the context in which the goal or task is to be interpreted. The message can be comprised of the following format:

(goal)(index)(i.d. of calling agent)(i.d. of agent which is to be acknowledged)

where i.d. represents "identification".

The index is the identification of the process which is being served by the goal, and can be comprised of the following format:

(i.d. of originating agent)(sequence number)

A process is executed by a series of goals and tasks which are passed between agents and servant objects. It is important that the agent be able to authorize, police and meter a goal from a calling agent. In this case the agent can check the identification of the calling agent with the list of goals which it is authorized to set.

The agent typically will be participating in many processes at the same time, and must maintain a context for each of these processes.

The index uniquely identifies each process. Identifications are assigned to an agent by its group agent, which should be arranged hierarchically based on the group agent's identification.

Thus identifications are open ended and are reusable. It is also possible to authorize access based on hierarchical membership in the organization based on analysis of part of the identification.

As noted above, agents have goal resolution mechanisms. With reference to FIG. 4A, as an alternative to the blackboard type of system, these mechanisms relate to goals, which goals are stored in the information area 29, listed in goal directories 33. Each agent has access to its own goal directory, which contains a list of goals understood by the agent, and a procedure needed to accomplish each goal. Each also has access to its procedure table 35, which, for a given procedure, has a pointer to a software program 37 to run it.

Each of these can be updated or added to by other agents which either have jurisdiction over the agent, or which are granting usage rights for a particular process.

In the case of an agent 38 asking for a new service to be created, as shown in FIG. 4B it posts the request to blackboard 39. The successful process agent 39 that is chosen to construct the service creates a new procedure 41 which is downloaded into the agent 38 since he has established and is now granting usage rights over the various components of the procedure.

Figure 4D:
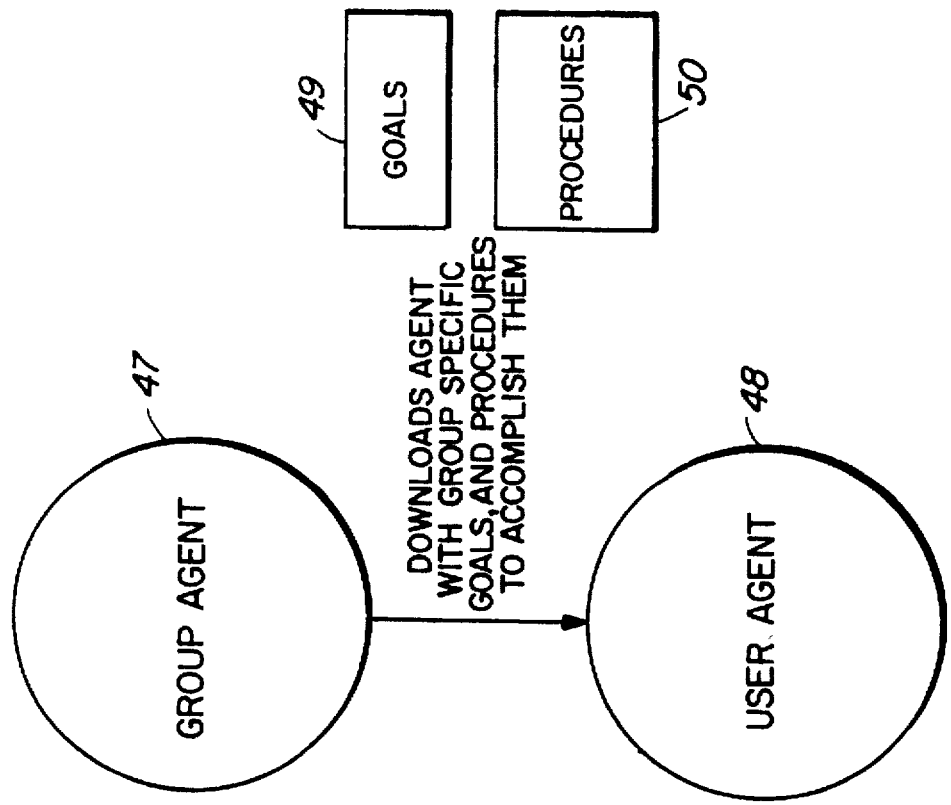
Figure 4C:
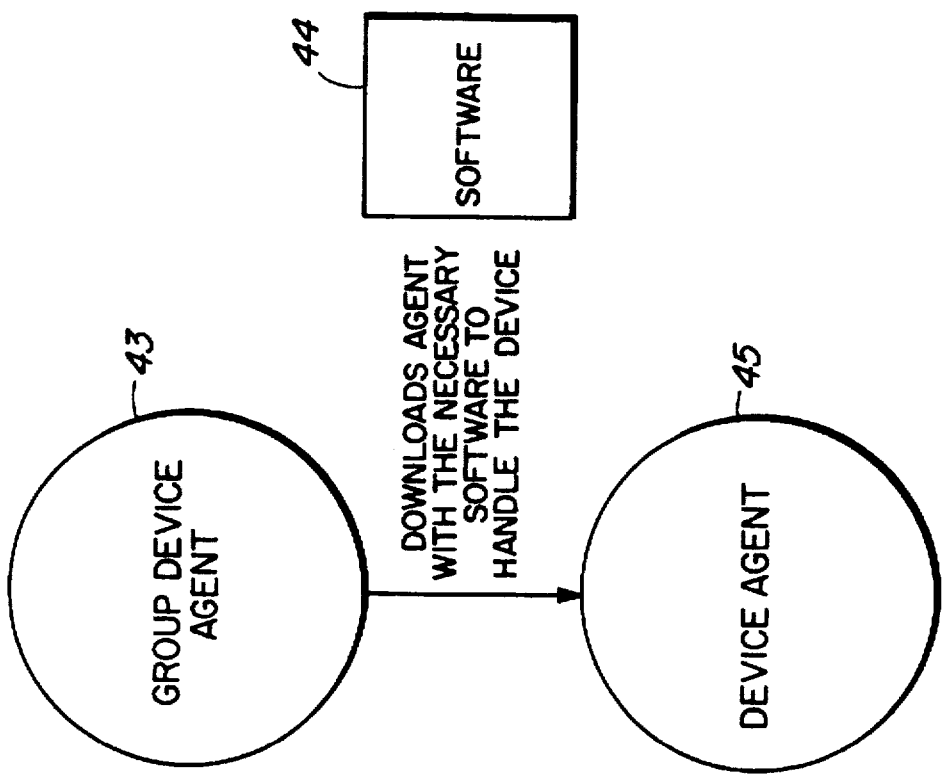

With reference to FIG. 4C, in the case in which a group agent 43 wishes to create a new instance of a device agent, it can, through jurisdiction, download the new device agent 45 the necessary software programs 44 to control a device controlled by the new device agent.

With reference to FIG. 4D, in the case in which a group user agent 47 has jurisdiction over a user agent 48, it can endow that agent with group specific goals 49 and procedures 50 necessary to accomplish them, for the operation of the group over which the group agent 47 has jurisdiction.

Figure 5:
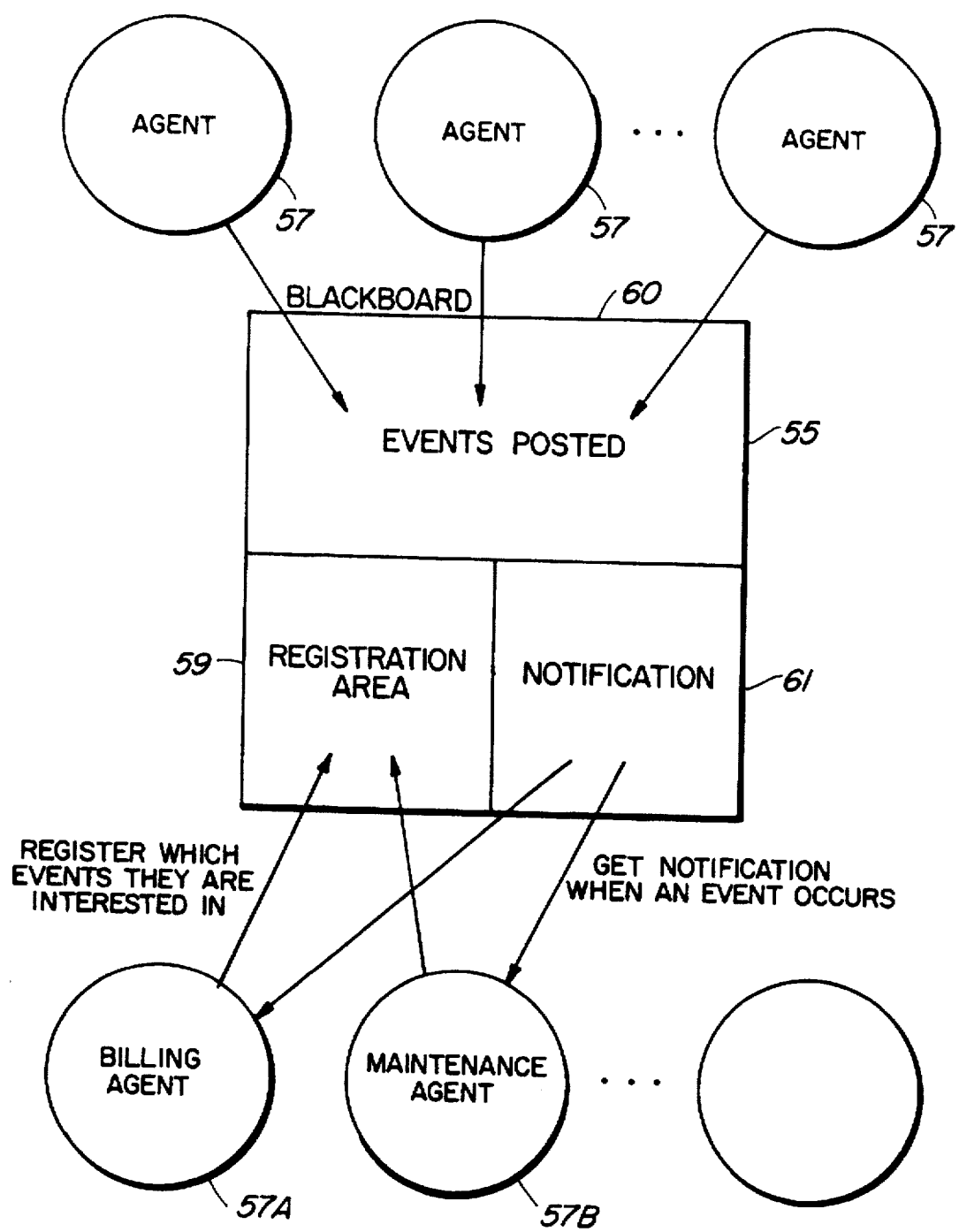
FIG. 5 illustrates a blackboard process of the system.

With reference to FIG. 5, when a significant event occurs in an agent, it posts that event to a blackboard 55. Any agent 57 which is interested in a particular event registers that fact in a registration portion 59 of the blackboard 55. When an event occurs, the blackboard is informed, and all interested agents are notified, in a notification area 61 of the blackboard.

Thus for example, if a new billing process is to be added to the system, the concerned agent registers with the blackboard 55 the events it is interested in that may have to do with the billing process. Agents posting any events on the blackboard do not require knowledge that the new billing process agent exists, or where it is physically on the system.

In the system shown in FIG. 5, the example billing agent 57A and the maintenance agent 57B register which events each is interested in, in the registration area 59 of the blackboard. When an event occurs, as posted in the "events posted" area portion 60 of the blackboard 55, if there is data or a procedure that concerns the billing agent or maintenance agent corresponding to the events they have registered that they are interested in, they are notified from the notification area of the blackboard 55.

Neither is it necessary for the entire blackboard be located in one physical location. Each portion of the blackboard could be located in different physical locations, and could be accessible by different processors.

Figure 6A:
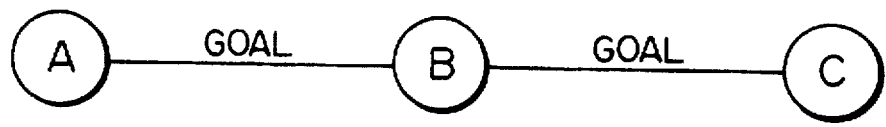
FIGS. 6A, 6B and 6C are diagrams used to illustrate pursuance of goals using several agents in different ways.

In general, a goal is created and is passed along from agent to agent in the process shown in FIG. 6A. the goal and index are constant. However at each stage the identification (i.d.) of the calling agent is changed. This i.d. is used to set the context in which the goal is to be interpreted.

Figure 6B:
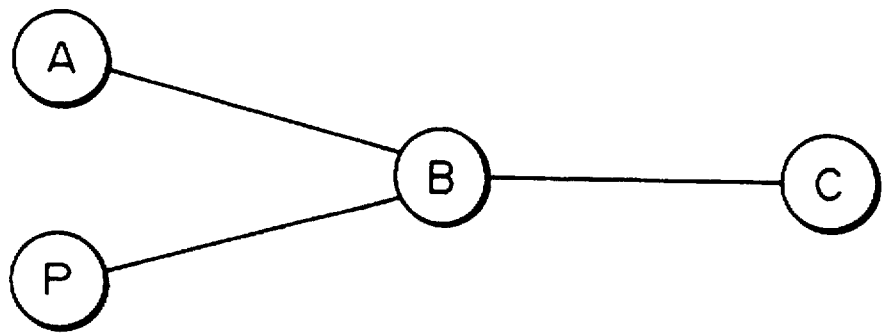

As shown in FIG. 6B, agents A and P may have customized agent B to act differently given the same goal. For example, the goal could be the button push on a telephone set. The agent B acts differently on these button pushes after being informed by the telephone agents A and P. Agent A could have set the button push to be a speed dial. Agent P could have customized it to be a line select.

The i.d. of the acknowledging agent in the message indicates to which agent the success or failure of the goal at the current agent is to be acknowledged.

For example, rather then using the process shown in the diagram of FIG. 6A, the agent B may decide to accomplish its goal by invoking other agents, which are unknown to the originator agent A. Thus the process diagram could appear as shown in FIG. 6C.

Figure 6C:
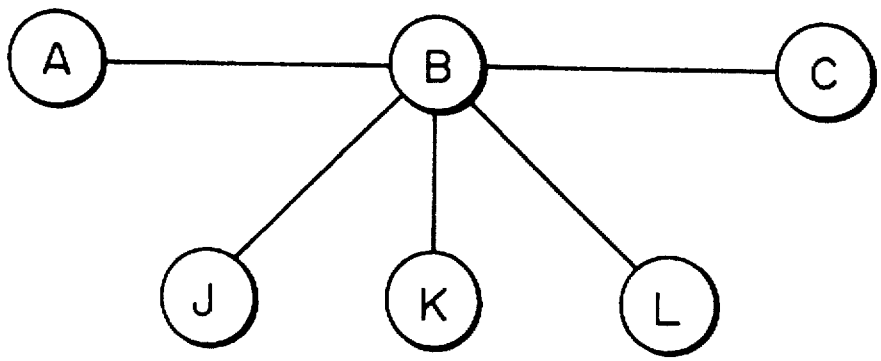

In FIG. 6C, agents J, K and L are under the direction of agent B. If by chance they are unable to achieve their goals, they can acknowledge this to agent B which can take corrective action to clean up side effects of their operation and to further attempt to achieve the goal. Agent B is able to set this up by sending the goal with its own i.d. as the acknowledgment in the message. This allows each stage of the process to be independent of the other stages and to be responsible for their own side effects.

Figure 7:
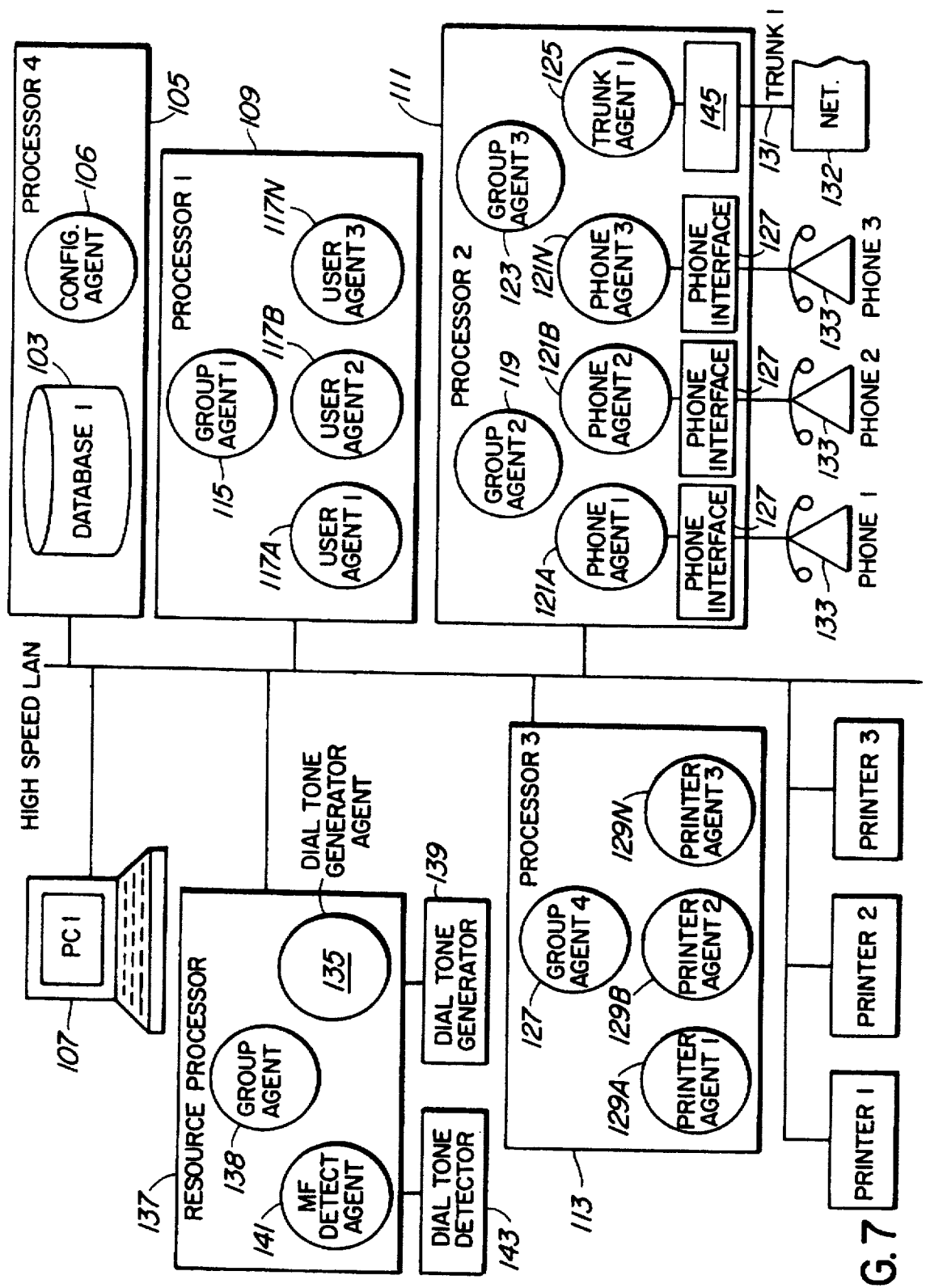
FIG. 7 is a block diagram of a system, in accordance with a preferred embodiment of the invention.

An example of a system and its operation will now be described with reference to FIG. 7.

The backbone of the system is a high speed transmission network, which in this embodiment is a high speed LAN (local access network) 101. However it should be recognized that the transmission system need not be a LAN, but can be a wide area communication network (WAN) than can span for example a campus, a city, a country or plural countries, and can be comprised of several bridged LANs and/or WANs.

A master database 103 is contained in a random access memory (RAM) which can be for example a hard disk drive. The database 103 is contained in a processor system 105 which is connected for communication to the LAN 101. Processor system 105 also is comprised of a configuration agent 106.

A computer 107 is also connected to the LAN. The computer is used to enter configuration data for storage in database 103.

Various other processor systems such as 109, 111 and 113 are also connected for communication via the LAN. Processor system 109 is comprised of a group agent 115 and user agents 117A, 117B . . . 117N. Processor system 111 is comprised of group agent 119 and phone agents 121A . . . 121N, as well as group agent 123 and trunk agents 125A . . . 125N. Processor 113 is comprised of group agent 127 and printer agent 129A . . . 129N.

Processor agent 111 communicates with various trunks 131 to the external communication network 132 and with various phones 133. Printers 135 are connected to the LAN, although as an alternative they could be in communication with printer agents 129A–129N directly via processor system 113.

Processor system 105 contains a computer program (referred to herein as a "process") for configuring each of the various agents and their goals. A goal is a definition of the purpose of a particular desired function, for example the connection of a phone with a trunk. The configuration program is responsible for downloading the goals stored in database 103 to each of the various agents at start-up, and as new agents, devices, and goals are added, changed or removed from the system. Database 103 also preferably stores a directory of addresses for the various different agents, in order that when a goal is to be accomplished, the addresses of the required agents may be obtained from the database, by the agent requiring it.

The memory also contains reserved areas for each of the agents.

The configuration agent 106 has jurisdiction over all other agents, since it controls what all agents can perform. It in effect is the master agent of the system.

Processor system 109 stores the processes which handle both the group agent 115 and the user agents 117A–117N. The group agent represents the group interests for the user agents, and has jurisdiction over them, and both creates and configures each of the user agents when a user (e.g. subscriber) is to be logged onto the system.

Processor 111 stores the processes which handle group agents 119 and 123, as well as phone agents 121A–121N and trunk agents 125. Group agent 119 has jurisdiction over and is responsible for creating and initializing any of the phone agents in its group when one of the user agents requests a phone resource.

The user agents can obtain usage rights on a particular phone agent by messaging over the LAN, asking the phone group agent for those rights. This is an example of sending (setting) a goal from a user agent to group agent 119.

Group agent 123 is a group agent for trunk devices. A user agent can send a message over the LAN to group agent 123 to gain access to a trunk. The group agent 123 then sends a goal to a trunk agent 125 which acts to assign a trunk.

Preferably a trunk agent is obtained by negotiating a portion of time or capacity on the set of trunks. This can be obtained by posting a requirement (e.g. a destination, a bandwidth, and/or a data rate) on a bidding list. Each of the trunk agents can bid to fulfill the requirement, according to for example a condition, such as a minimum cost route for the posted requirement. Such a bidding and fulfillment process is described as a blackboard system, as generally described in articles referred to above.

It may be sent that two types of goal setting have been described, e.g. one contained in the user agent which defines the trunk resource usage rights that it needs, and the other which asks for use of part of the group agent 123 resources, i.e. the whole or part of a trunk.

Processor 113 stores the processes for group agent 127, and of the printer agents 129A–129N. A user agent 117A–127N can negotiate using a setting goal by sending a message to group agent 127, to use a portion of the printers, or can negotiate for exclusive use of one printer, by using for example the blackboard bidding system.

In the present example, when a user wishes to make a phone call, the telephone 133 handset is removed from its cradle, thus going offhook. A phone agent is in a program loop, monitoring the subscriber's line current via dedicated phone interface 127. When it detects the increase in line current resulting from going offhook, it sends a message to processor system 105, advising it which phone went offhook. The offhook detection establishes a goal for the phone agent which detected it. The phone agent, upon receiving the offhook detection indication, accesses a goal directory stored in its dedicated portion of RAM, and follows an associated sequence of steps to formulate the message and to apply it to LAN 101 destined for processor system 109. Group agent 115 receives the message as a goal to assign a user agent 117A–117N.

User agents 117A–117N can bid to fulfill the goal, for example by using a blackboard process, or a user agent can be assigned directly by the group agent 115. Either way, a user agent is assigned by the group agent 115. The user agent, receiving the goal defined by the offhook signal, accesses its database of related process steps, and formulates a message to the phone agent identified in the original goal to seek a device agent which will return dial tone to the phone, and sends it via LAN 101. The group agent 119 receives the message and sends a goal to a dial tone generator device agent 135 associated with another processor system 137 in communication with the LAN 101, via group agent 138. Device agent 135 receives the goal, and enables a dial tone generator 139 which it controls to apply digital dial tone via LAN 101 to the phone agent 121 associated with the offhook telephone. The phone agent sends it via the dedicated phone line interface through which it detected the offhook signal, to the phone 133.

The user agent, at the same time as sending a goal to a dial tone generator device agent 135, also sends a goal to a dialing signal (digital multifrequency) detector agent 141, which connects a dial tone detector 143, dedicated to the dialing signal agent 141, to the LAN 101 for detection of digital dialing signals. When a user dials the offhook telephone, analog MF signals generated in the telephone are received by the phone interface 127, are converted to digital, and are sent under control of the associated phone agent via the LAN as messages to the MF dialing tone detector 143.

On receiving dialing tones, the dial tone detector stores them in a manner known in the art, and its agent 141, receiving a goal as a result of determining that a trunk is needed due to the initial digits detected, looks up a corresponding process sequence in local RAM and sends a goal via group agent 138 and LAN 101 to group agent 123, related to trunk agents 125, requesting a trunk. Group agent 123, using for example a blackboard bidding technique, obtains the services of a trunk agent 125, and passes the goal to that trunk agent. The trunk agent has a dedicated trunk interface 145, that it controls, and seizes it, seizing the trunk. The trunk agent then sends a message to the MF detection agent 141 via LAN 101, advising that the trunk has been seized. This is considered as a goal by the MF detection agent 141, causing it to send the dialing digits to the trunk agent 125 for transmission over the trunk.

A message is also sent by the trunk agent 125 to the configuration agent 106 advising it of the seizure of the trunk, and the configuration agent, having received a message from the phone agent 121A of the dialing of a number, sends a message to the phone agent and to the trunk agent advising what LAN channel to use to interconnect the phone and the trunk. The communication path is thus established.

It should be noted that by usage rights, resources could have been reserved previously.

For example, the trunk agent can send a message to the MF detector agent to detect the tones. The MF detector agent could be selected at the time by a bidding process. However it could have been selected previously and held in reserve by the trunk agent. Thus the real time required by the bidding process is saved and system stability is enhanced because the trunk agent can reserve the resources that it needs for normal operation. Thus the chance of failure due to lack of a suitable resource is lessened.

An agent may reserve usage rights on other agents and select these agents dynamically through its resource broker. These policies for selection are local to the broker and can be used for a variety of purposes. For the current example, the trunk agent could have reserved usage rights of two or more MF detector agents and then use this as a means of redundancy (e.g. by load sharing or other means). Thus the required reliability may be selected by software mechanisms within the agent. A highly reliable agent could use a complex selection process. An agent to which reliability is not important could use very simple, less costly procedures.

As noted above, the distributed system of independent agents interact by the interchange of goals. In the present invention, an agent operates in accordance with a set of internal instructions called a script. An agent begins to execute a script in response to a message (called a goal in this specification) from another agent.

Within a script, it is sometimes desirable to start two simultaneous sets of events, called threads. The present inventive improvement, any number of threads can be created without the requirement of providing special multi-thread control structures within the agent. This simplifies the design of the agent, making it operate faster and more robust.

Previous multithread systems were implemented in monolithic systems such as computer systems. In such systems, threads have been regarded in a manner similar to processes. The threads are scheduled by the system operating system, and maintain their own stack.

A related type of system which operates threads is found in the standard distributed computer environment (DCE). However DCE requires that the operating system support the creation of threads.

The present inventive improvement takes threading out of the operating system and places it into the normal course of agent to agent interaction.

Upon receiving a goal, an agent attempts to perform the actions requested by another agent. In the present inventive improvement, each agent contains an internal script which indicates the sequences of actions that it should perform to achieve the goal. In accordance with one embodiment, the script is a linear list of instructions. Each member of the list is indexed by an internal number called the program counter (PC). There is one script for each service path. The contents of a script should contain its name and a list of formal arguments. The name of the script can usefully match the name of the call goal passed to the agent.

An instruction object should contain the identification of the agent to be called by the instruction and the goal to be sent to the object, a list of names of the variables whose values will be passed to the called agent as the arguments of the call, separate list for ACK, NACK and CA CACK (to be described below) of names of object variables whose values are to be returned in the arguments of the returned message, and PCs to indicate the next instruction given either ACK, NACK or CACK returns.

The agent sends a goal to another agent, but may send a goal to itself. A receiving agent will attempt to accomplish the goal and will return various codes to indicate its degree of success. The return of an ACK code indicates that the goal has been achieved successfully or that the result of a boolean test is true. The return of a NACK code indicates that the goal has not been achieved or that the result of a boolean test is false, and the return of a CACK code indicates that it is not possible to achieve the goal (for example for an unexpected failure such as unknown goal, unauthorized request, the called agent is overwhelmed and is unable to process any additional goals, etc.)

An instruction is preferred to contain:
1. PC
2. Goal to send to the subject agent or to another agent.
3. A list of values of the arguments to send with the goal.
4. PC to perform upon the reception of an ACK acknowledgment.
5. PC to perform upon the reception of a NACK acknowledgment.
6. PC to perform upon the reception of a CACK acknowledgment.
7. List of variables in which to store returned data variables.

An example of a dynamic functional model of a goal resolver and goal queue, in which an ACK, NACK and CACK acknowledgment message is returned follows.

```
loop
     wait for goal g from goal queue
     case type(g)
     "call";
          if we don't understand g.scriptname
               log error into Info Area
               send CACK via CACK-SERVANT
          else
               create session using return address
               of g bind actual args to formal args
               initialize other script variables of
               session
          endif
     "ack":
          if g.dest_session does not exist (in session
                         dictionary of goal resolver)
               log error/warning in Info Area
               (and just ignore it)
          else
               i:=instruction at g.desct_pc
               store g.return values in ack_variables
                         named in i.
               execute instruction at i.ack_pc
          endif
     "nack":
          if g.dest_session does not exist
               (see ack)
          else
               i:=instruction at g.dest_pc
               store g.return values in nack_variables
                         named in i
               execute instruction at i.nack_pc
          endif
     "cack":
          if g.dest_session does not exist
               (see ack)
          else
               i:=instruction at g.dest_pc
               store g.return values in cack_variables
                         named in i
               execute instruction at cack_pc
          endif
     "update bidder":
          locate g.source_agent_id in Called Agent
                         dictionary
          update each bidder for that called Agent with
                         data from g.
          endif
```

Figure 8:
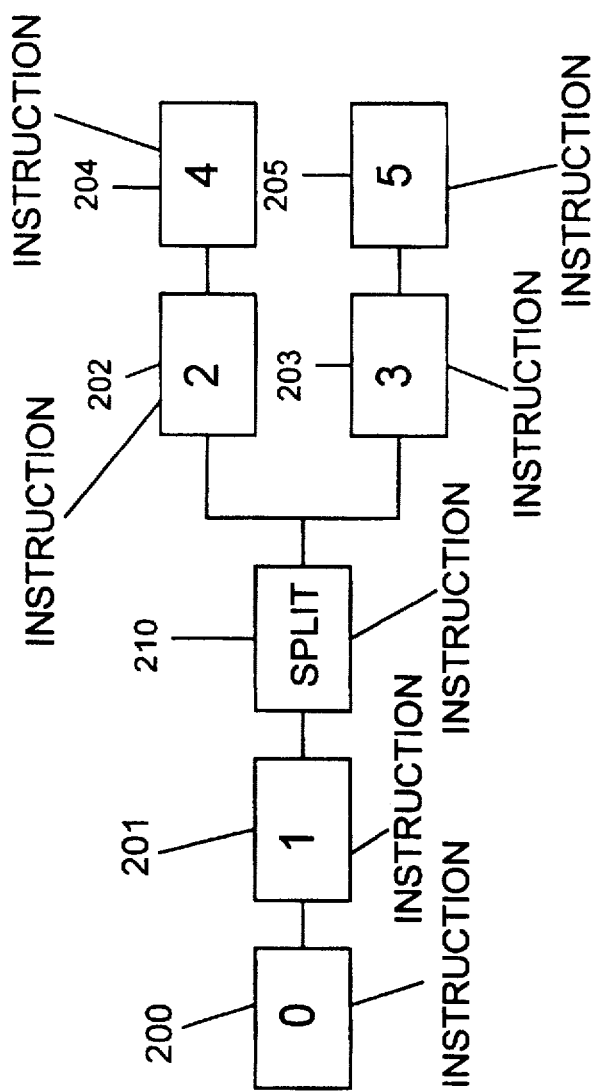
FIG. 8 illustrates a sequence of instructions in an example of a multi-threading embodiment of the invention.

As noted earlier, within a script there are cases in which it is desirable to split the sequence of operations into two or more threads. Threads can be described as contemporaneous sets of goals to be performed. This is shown in FIG. 8.

Each block 200–210 represents an instruction in the script. The connections between the blocks represent connection to the instructing instruction, as designated by a PC, which should be performed upon receipt of and ACK from a preceding instruction. NACK and CACK returns have been not shown for clarity.

For example, the beginning of the script is executed linearly as indicated by the instructions 200 and 201. After performing instruction 201, two parallel threads of action are required, as indicated by the beginning instructions 202 and 203 of each parallel thread. The split is accomplished by the control instruction 210 (SPLIT), which emits the two goals required to initiate actions 202 and 203.

A SPLIT goal is one of special internal goals, and may be described in several ways. For example, one way is to use a single instruction and to immediately execute the instructions indicated at the ACK and NACK PC locations in the instruction. Alternatively the next two instructions immediately following the SPLIT instruction may be executed. The second method allows a SPLIT instruction to create any number of threads.

It is important in providing the present inventive improvement to provide the current PC in goals sent out to begin actions 202 and 203. That current PC is used as the return value by the called agent or action. Thus the agent called in action 202 returns its acknowledgment reply to the instruction indicated in action 202. Similarly the agent called in action 203 returns its acknowledgment reply to the instruction that called it. Since each of these instructions points to the next instruction in its thread, a successful generation of multiple threads has been accomplished without requiring special control structures within the agent. Indeed any number of threads can be generated.

The calling instruction PC circulates with the thread calls, keeping each of them distinct.

The scheduling of threads is thus not required to be performed in the operating system, and has been placed in the environment of the agent to agent interaction. There is no need for special areas within the agents to maintain the threads that they create. The threads are maintained by the goals which are circulating between agents.

Since the threads are maintained by the identity of the PC and the agent, the inventive improvement is not restricted to a single machine. It can be networked among a group of machines over a LAN or other communication network. The agents can reside in different machines. Their interactions need be coordinated only by the exchange of goals.

In summary, therefore, an embodiment of the present invention is a method of operating an agent comprising receiving a message (goal) from another agent and performing a sequence of actions required by the goal, each action of the sequence of actions containing at least one instruction, each instruction containing an index number (PC), an action pointing to another action in a thread of actions, informing a subsequent action of a previous instruction including designating the PC of the previous instruction whereby a subsequent action is informed of an instructing PC, and returning an action completion acknowledgment message to a preceding action containing an instruction designated by the instructing PC, whereby the action containing the instructing PC can point to various different PCs to carry out different actions upon receipt of various acknowledgment messages.

In accordance with another embodiment, the various acknowledgment messages include an indication that the action has been successfully completed (ACK), and at least one of an indication that the action has not been achieved (NACK) and that the action cannot be achieved (CACK).

In accordance with another embodiment, one of the actions is a split to at least two subsequent parallel sequences of action (threads), each action informing a subsequent action in its thread of the PC of an instruction in a preceding action, and returning an acknowledgment message to the preceding action at the split or in its thread if subsequent to the split.

A person understanding this invention may now conceive of alternative structures and embodiments or variations of the above. All of those which fall within the scope of the claims appended hereto are considered to be part of the present invention.

I claim:

1. A method of operating an agent comprising receiving a message (goal) from another agent and performing a sequence of actions required by the goal, each action of the sequence of actions containing at least one instruction, each instruction containing an index number (PC), an action pointing to another action in a thread of actions, informing a subsequent action of a previous instruction including designating the PC of the previous instruction whereby a subsequent action is informed of an instructing PC, and returning an action completion acknowledgment message to a preceding action containing an instruction designated by the instructing PC, whereby the action containing the instructing PC is able to point to various different PCs to carry out different actions upon receipt of various acknowledgment messages.

2. A method as defined in claim 1 wherein the various acknowledgment messages include an indication that the action has been successfully completed (ACK), and at least one of an indication that the action has not been achieved (NACK) and that the action cannot be achieved (CACK).

3. A method as defined in claim 1 in which one of the actions is a split to at least two subsequent parallel sequences of action (threads), each action informing a subsequent action in its thread of the PC of an instruction in a preceding action, and returning an acknowledgment message to the preceding action at the split or in its thread if subsequent to the split.

4. A method of operating a communication system comprising:

(a) providing a plurality of process agents for receiving goal commands (goals) and for invoking a process to achieve said goals, (b) providing a plurality of device agents, each in communication with its own device, for receiving and storing goals from a process agent, and for operating its corresponding device in response to receiving said goals from a process agent, (c) interconnecting all of said agents and carrying goals between agents thereby, (d) receiving a goal from another agent and performing a sequence of actions required by the goal, each action of the sequence of actions containing at least one instruction, each instruction containing an index number (PC), an action pointing to another action in a thread of actions, (e) informing a subsequent action of a previous instruction including designating the PC of the previous instruction whereby a subsequent action is informed of an instructing PC, and (f) returning an action completion acknowledgment message to a preceding action containing an instruction designated by the instructing PC, whereby the action containing the instructing PC is able to point to various different PCs to carry out different actions upon receipt of various acknowledgment messages.

5. A method as defined in claim 4 wherein the various acknowledgment messages include an indication that the action has been successfully completed (ACK), and at least one of an indication that the action has not been achieved (NACK) and that the action cannot be achieved (CACK).

6. A method as defined in claim 4 in which one of the actions is a split to at least two subsequent parallel sequences of action (threads), each action informing a subsequent action in its thread of the PC of an instruction in a preceding action, and returning an acknowledgment message to the preceding action at the split or in its thread if subsequent to the split.

* * * * *